June 15, 1926.

F. E. COLBERT 1,588,447

SLOT CLOSING DEVICE

Filed May 3, 1926

Inventor

Francis E. Colbert.

By A. D. O'Brien

Attorney

Patented June 15, 1926.

1,588,447

UNITED STATES PATENT OFFICE.

FRANCIS E. COLBERT, OF DENVER, COLORADO.

SLOT-CLOSING DEVICE.

Application filed May 3, 1926. Serial No. 106,416.

This invention relates to improvements in devices for closing the pedal slots in automobile floors.

Every automobile is provided with two or more pedals for controlling the clutch and brake and at least one make of automobiles has three pedals one of which is for controlling the reverse.

Wherever pedals are used the floor must be provided with slots so that the pedal can be rotated about its pivot point to the extent required. These slots permit cold air and dust to enter the interior of the car and this is highly objectionable especially in connection with closed cars as the foul air that enters through the pedal slots make it uncomfortable for the occupants and besides this helps to soil the upholstery. To prevent dust and dirt from entering through the slots various schemes have been proposed, some of which include the use of felt or rubber flaps which yield when the pedal arm moves but which normally occupy a position in which they substantially close the slots.

It is the object of this invention to produce a device for closing the slots which is so constructed and designed that it can be made of sheet metal and which will be positive in its operation, which can be easily applied to the cars and which can be cheaply constructed.

My invention briefly described consists in providing two superposed sheet metal plates with diagonal slots which extend in opposite directions and which form an opening at their intersection through which the pedal arm may project. Means is provided to prevent these plates from moving longitudinally and at the same time permit them to move transversely with respect to each other. As the pedal arm is moved, it will cause these plates to slide transversely and thereby move the point of intersection of the slots longitudinally in a manner which will become clear from the detailed description which will be given hereinafter.

Having now briefly described my invention, I will proceed to describe the same in detail and reference for this purpose will be had to the accompanying drawing in which the preferred embodiment thereof has been illustrated, and in which:

Figure 1.

Numeral 1 designates the foot board which is provided with a plurality of parallel slots 2 through which the pedal arms C, R and B extend. In the operation of a car these pedals are moved about their pivots in order to control the clutch, reverse the car or apply the brake. This movement is of considerable magnitude and requires that the slots 2 shall be of considerable length. When the slots 2 are open, they provide a passageway through which dust, dirt and foul air may enter the car. In winter time the cold air that enters through these slots makes the interior of the car uncomfortable and in a similar way the heated air that enters during the hot weather is also objectionable.

As has been stated above, it is the object of this invention to provide a mechanical means for maintaining the space between the pedal arms and the foot board closed at all times, and for this purpose the mechanism which I will now describe has been produced.

Figure 4:
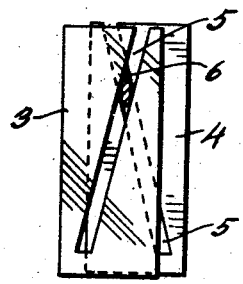
Figure 4 is a view similar to that shown in Figure 3 but showing the plates in a slightly different position.
Figure 3:
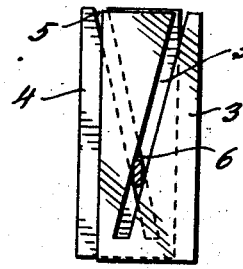
Figure 3 is a detailed view showing one position of the superimposed plates.
Figure 6:
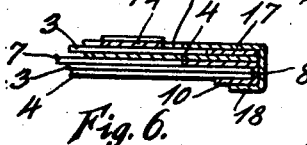
Figure 6 is a section taken on line 6—6.

Before entering upon the detailed description of the construction, I will first describe the principal feature of the construction. In Figures 3 and 4 I have shown two rectangular plates which I have designated by numerals 3 and 4. These plates are of a length slightly greater than the length of the slots 2 which they are designed to close. Plates 3 and 4 may be identical in size and shape, and each has a diagonal slot 5 that extends inwardly from one end and terminates a short distance from the other end. The plates are assembled in reverse relation so that the slots 5 cross each other, thereby providing a diamond-shaped opening which has been indicated by numeral 6. The pedal arm which extends through the slot that is covered by means of a pair of these plates, projects through the opening 6 in the manner indicated in Figures 3 and 4.

Let us now assume that the plates 3 and 4 are prevented from moving longitudinally, but are permitted to move freely in a direction transverse to their longitudinal axes. If the pedal arm is now moved in a longitudinal direction, the plates will have to move transversely. For example, when the pedal arm occupies the position shown in Figure 3, the under plate 4 extends to the left of the upper plate 3. If we now move the pedal arm to the position shown in Figure 4, it will be noticed that plate 4 has been moved so that it now extends to the right of plate 3. By mounting plates 3 and 4 in a suitable housing which permits them to move transversely but restricts their longitudinal movement, it is evident that they will adjust themselves to the position of the pedal arm which passes through the openings formed by the intersection of the diagonal slots 5.

Figure 1:
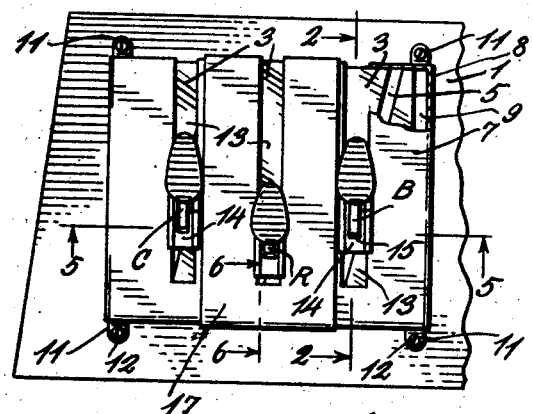
Figure 1 is a plan view with a portion broken away showing my improved slot closing device in place.
Figure 2:
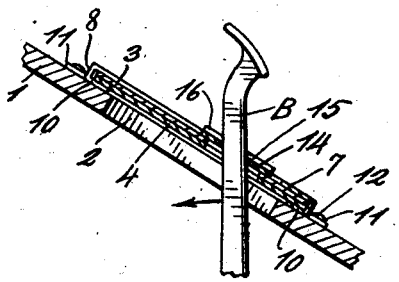
Figure 2 is a section taken on line 2—2, Figure 1.
Figure 5:
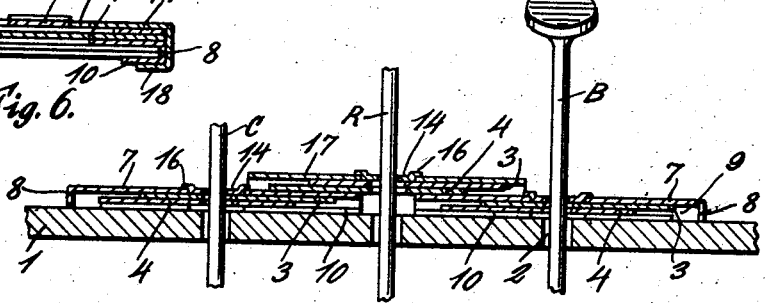
Figure 5 is a section taken on line 5—5, Figure 1.

In Figures 1 and 5 I have illustrated an assembly which is adapted to be used in connection with three pedal arms. In the illustration shown, a housing formed by a flat plate 7 encloses two sets of these relatively movable plates. The housing has its edges bent downwardly in the manner indicated by numeral 8 so as to hit against the base board and form a recess 9 of a thickness equal to three thicknesses of the material employed. The flanges 8 that extend along the upper and lower side of the housing have their edges 10 bent reversely so as to form a channel for the reception of the ends of plates 3 and 4. The enclosing casing is provided with a plurality of lugs 11 that are adapted to receive screws 12 by means of which the casing is secured to the upper surface of the foot board. Slots 13 are provided in the flat side of the part 7 and these slots are located directly above slots 2 in the foot board, so that the pedals will extend through the slots 2 and 13 in the manner shown in Figure 1. It will be noticed that the slots 13 extend entirely through the upper edge of the plate 7, and plates 3 and 4 may be moved transversely of each other until the open ends of the slots 5 register with the open ends of slot 13 and in this way the protective device can be applied to and removed from the pedals by a simple sliding movement. From Figures 3 and 4 it will be apparent that the diamond-shaped opening 6 does not fit closely about the pedal arm and I have therefore provided an additional element, which I have indicated by numeral 14, and which consists of a plate that is provided with a central opening 15 of the proper size and shape to receive the pedal arm. This plate is provided with offset flanges 16 that extend beyond the sides of the slot and rest on the upper surface of the plate 7, in the manner shown in Figures 1, 2 and 5.

Where a single slot is to be covered an assembly comprising two plates 3, 4 and an enclosing housing is sufficient; but this must be duplicated for every pedal. In the illustration shown there are three pedals and these are so close together that they will not permit three sets of sliding plates to operate in the same plane. It has therefore been necessary to arrange the closing mechanisms for pedals C and B in the same plane and to place the sliding plates and the enclosing cover section 17 for the pedal R on top of the enclosing housing 7. The plate 17 may have its end bent into U-shape so as to provide flanges 18 that engage the flanges 10 of the member 7, whereby it will be held in assembled relation.

It is apparent that the novelty in this invention does not reside in the specific construction which has to be resorted to where a plurality of closely located pedal slots are to be protected, but rather in the construction of each separate unit, which consists of two sliding plates 3 and 4 having oppositely arranged diagonal slots and which are enclosed within a housing that permits transverse movement of the plates but prevents them from moving longitudinally.

From the above it will be apparent that I have provided a simple mechanical device which is well adapted to close the pedal slots in an automobile foot board. The fact that this device is made entirely of metal, assures that it will always function in the manner desired. The plates 3 and 4 are duplicates and one die will therefore be sufficient for both of these plates. The enclosing housing 7 can also be very cheaply made by means of properly constructed dies and for this reason the cost of manufacture will be reduced to a minimum.

Having described the invention what is claimed as new is:

1. A slot closure comprising, in combination, a pair of superimposed relatively transversely movable plates, each having a diagonal slot extending inwardly from one end, said slots being reversely arranged so that they will cross and means for preventing relative longitudinal movement of said plates while permitting them to move transversely relative to each other.

2. In combination, a support having an elongated slot, a pedal arm movable longitudinally of the slot, a pair of superimposed plates supported in parallel relation to the supporting surface, each of said plates having a slot extending inwardly from one end thereof in a diagonal direction, the plates being so arranged that the slots cross each other so as to form a diamond-shaped opening adapted to enclose a pedal arm and means for preventing said plates from moving longitudinally with respect to each other while permitting relative transverse movement.

3. In combination, a support having a longitudinal slot, a pedal arm extending through the slot and movable therealong and means for closing all parts of the slot except that through which the arm extends, said means consisting of two plates having slots extending inwardly from one end, said plates being superposed and so arranged that the slots in the plates cross each other and the slot in the support at the point where the arm extends through the latter and means for preventing relative longitudinal movement of the plates while permitting free relative transverse movement.

4. A device for closing a slot through which an arm moves, comprising a casing having a slot extending inwardly from one end, a pair of parallel opposed spaced guideways extending transversely of the slot, two superposed plates slidably mounted in the guideways, each of said plates having a slot extending inwardly from one end and terminating near the other end, said slots extending at an angle to the slot in the casing so that they will cross the latter, the slots in the movable plates being inclined in opposite directions so that they will cross each other.

In testimony whereof I affix my signature.

FRANCIS E. COLBERT.